H. E. Smith,
Washing Machine.
Nº 48,596. Patented July 4, 1865.
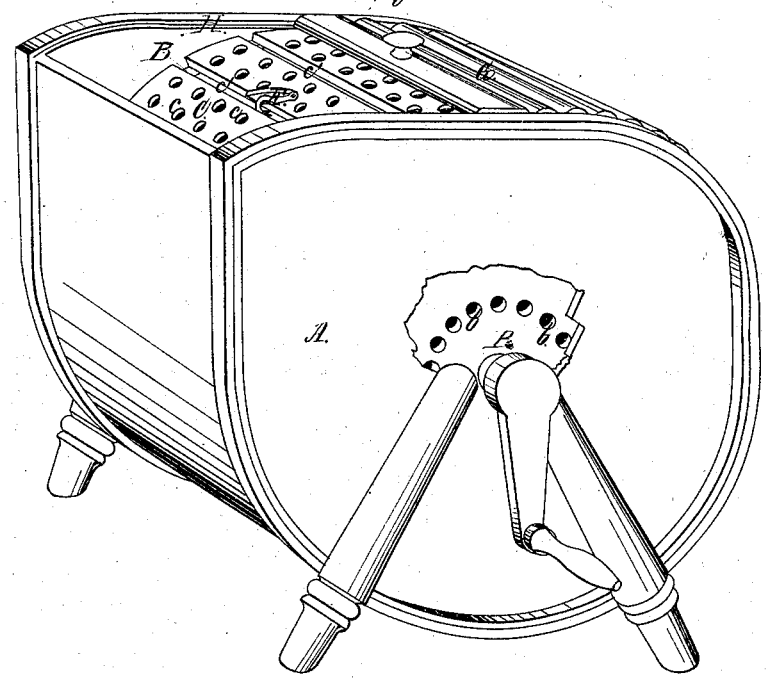
Fig: 1.
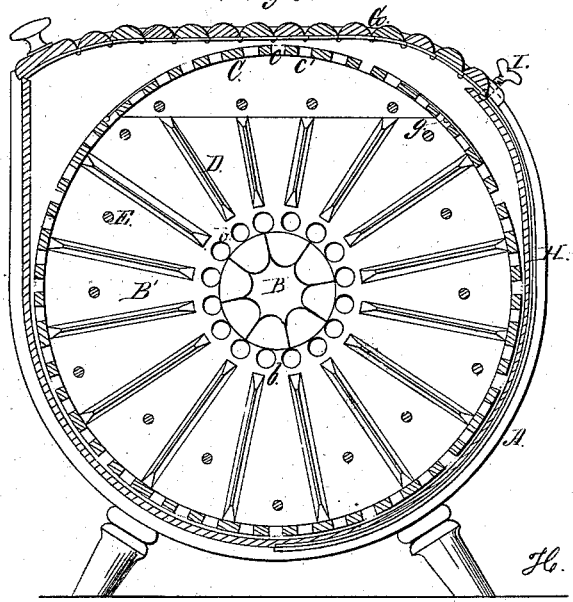
Fig: 2.
Witnesses:
Charles L. Fisher
James H. Layman
Inventor:
H. E. Smith
By Knight Bros
Attys

UNITED STATES PATENT OFFICE.

HAMILTON E. SMITH, OF CINCINNATI, OHIO.

IMPROVED WASHING-MACHINE.

Specification forming part of Letters Patent No. 48,596, dated July 4, 1865.

*To all whom it may concern:*

Be it known that I, HAMILTON E. SMITH, of Cincinnati, Hamilton county, Ohio, have invented a new and useful Improvement in Washing-Machines; and I do hereby declare the following to be a full, clear, and exact description thereof, reference being had to the accompanying drawings, making part of this specification.

My invention relates to, first, a form of cover capable of being housed compactly away or restored to its working position with facility and expedition, the said form enabling a machine to be placed in confined situations without obstruction to its operations, and imparting other advantages; secondly, a form of perforated horizontal rotary dasher.

Figure 1 is a perspective view of a machine embodying my improvements. Fig. 2 is a transverse section of the same.

A is a tub, of nearly cylindrical form, and having journaled horizontally within it a rotary cylindrical dasher composed of circular heads B B', connected by open slats C, which are perforated at $c$ in the manner shown. The heads B B' are also perforated at $b$, near their centers, to permit a free entrance of water, &c., to supply the place of that which during operation escapes through the perforations $c$ of the slats, and through the interstices $c'$ between them, so as to secure an active and efficient circulation. Radial ribs D on the interior surfaces of the heads and rods E, which extend from head to head, serve, in connection with the water-passages $b$ $c$ $c'$, to effect a very active agitation and most thorough ablution of the clothes.

Each head B B' is composed of two unequal segments of a circle, which form, with the slats C, two corresponding cylindrical segments, which, being hinged together by two adjacent edges, enable the smaller cylindrical segment to be lifted up, so as to serve as a lid for the introduction and removal of the clothes and for securely retaining the latter within the dasher in the act of washing. The two segments of the dasher are held together for operation by a hook, F, or other fastening.

In setting up machines of this class I have found the common hinged cover frequently in the way of light, or so as to interfere with the convenient supply or manipulation of the machine, while a removable cover was found to be too cumbersome and of inconvenient disposal.

In order to avoid the above objections I have devised a flexible cover composed of slats G, rounded on their upper sides, and either hinged together in the manner shown or connected by flexible straps of leather, gutta-percha, caoutchouc or other suitable material. The ends of the slats G occupy and travel in grooves or ways H in the sides of the tub. A set-screw, I, or any suitable catch, enables the flexible slatted cover G $g$ to be fixed in any desirable position, so as to be usable as a wash-board when desired. When so used, the flexibility of the slats will cause them to sag or bend down, so as to open their interstices and to permit the suds to run back into the tub.

I claim herein as new and of my invention—

1. The combined cover and wash-board G, constructed and applied as herein specified.

2. The combination of the heads B B', slats C, ribs D, rods E, and water-passages $b$ $c$ $c'$, arranged and operating as set forth.

In testimony of which invention I hereunto set my hand.

HAMILTON E. SMITH.

Witnesses:
 GEO. H. KNIGHT,
 JAMES H. LAYMAN.